(12) United States Patent
Usuki et al.

(10) Patent No.: US 6,977,786 B2
(45) Date of Patent: Dec. 20, 2005

(54) INFORMATION RECORDING METHOD USING A VERTICAL MAGNETIC SYSTEM

(75) Inventors: Kazuyuki Usuki, Kanagawa (JP); Masakazu Nishikawa, Kanagawa (JP); Makoto Nagao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 283 days.

(21) Appl. No.: 10/264,343

(22) Filed: Oct. 4, 2002

(65) Prior Publication Data
US 2003/0076611 A1    Apr. 24, 2003

(30) Foreign Application Priority Data
Oct. 4, 2001    (JP) .............................. 2001-308295

(51) Int. Cl.$^7$ .......................... G11B 5/86; G11B 5/596; G11B 13/00
(52) U.S. Cl. ................... 360/17; 360/77.03; 369/13.14
(58) Field of Search ............................. 360/15, 16, 17, 360/55, 59, 69, 75, 77.01; 369/13.38

(56) References Cited

U.S. PATENT DOCUMENTS

| | | | |
|---|---|---|---|
| 5,840,410 A | * | 11/1998 | Oiri et al. .................... 428/212 |
| 6,261,707 B1 | * | 7/2001 | Murakami et al. ... 428/694 ML |
| 6,570,724 B1 | * | 5/2003 | Komatsu et al. ............... 360/17 |
| 6,735,026 B2 | * | 5/2004 | Nishikawa et al. ........... 360/17 |
| 6,751,044 B1 | * | 6/2004 | Meeks et al. ............ 360/77.03 |
| 6,765,735 B2 | * | 7/2004 | Inui ............................. 360/17 |

FOREIGN PATENT DOCUMENTS

| | | |
|---|---|---|
| JP | 56-61031 | 5/1981 |
| JP | 61-009850 | 1/1986 |
| JP | 1-223649 | 9/1989 |

* cited by examiner

Primary Examiner—David Hudspeth
Assistant Examiner—Daniell L. Negrón
(74) Attorney, Agent, or Firm—Sughrue Mion, PLLC

(57) ABSTRACT

In an information recording method of the present invention by carrying out recording data while carrying out tracking servo accurately, high density recording of signals at a good S/N can be carried out, and high density recording by a vertical magnetic recording system can be carried out. A magnetic disk comprises a magnetic recording layer, and the magnetic recording layer is magnetized in advance such that magnetized regions A and B having different magnetization directions are formed. At a time of recording data, vertical magnetic recording is carried out by a magnetic head while carrying out accurate tracking servo by optically tracking by a magneto-optical effect utilizing a difference in the magnetization directions of the magnetized regions A and B. Therefore, high-density recording at a good S/N is possible.

10 Claims, 7 Drawing Sheets

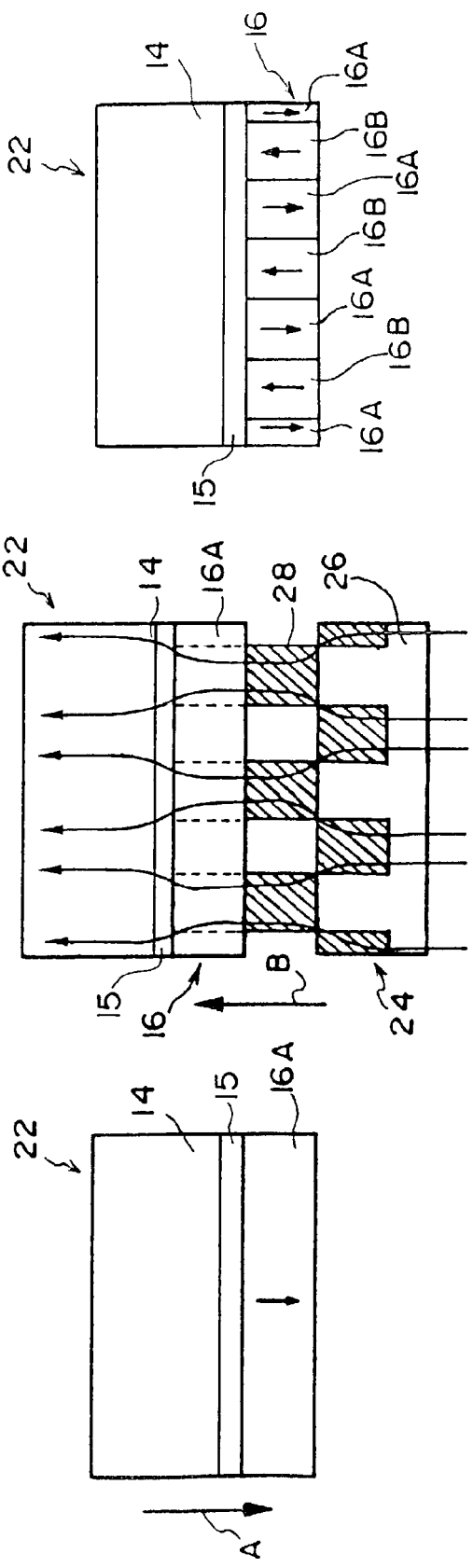

DIRECTION OF PLANE OF POLARIZATION OF LIGHT

INFORMATION RECORDING METHOD USING A VERTICAL MAGNETIC SYSTEM

BACKGROUND OF THE INVENTION

1. Field of the Invention

The present invention relates to an information recording method, and in particular, to an information recording method carrying out recording of data by a vertical magnetic system onto an information recording medium on which servo information for tracking is magnetically pre-format-recorded.

2. Description of the Related Art

Accompanying the rapid increase in the amount of information handled by personal computers, information recording media, which have a high capacity, are inexpensive and whose access time is short, have been developed one after another. Examples of such high-capacity information recording medium include a built-in type magnetic recording medium such as a hard disk, a removable magnetic recording medium such as a ZIP drive developed by Iomega Corporation, and the like. In the hard disk and ZIP, endowing the medium with a large capacity is realized by enlarging the track density by narrowing the width of the tracks. In order to playback a recording signal at a satisfactory S/N ratio by accurately scanning a magnetic head on the narrow tracks, a tracking-servo technology, which detects the relative offset between the magnetic head and the track and corrects the position of the magnetic head, performs an important role.

On a hard disk and a ZIP drive, a servo signal for tracking, an address information signal, a reading clock signal, and the like are recorded (pre-format-recorded) with high positional accuracy in advance at the time of manufacturing the magnetic recording medium. The regions (servo regions) at which these signals are recorded are discretely disposed with respect to the surface of the disk. The magnetic head accurately scans the tracks while checking and modifying its position by reading these signals.

On the other hand, currently, the magnetic recording system adopted in hard disk devices on the market is a longitudinal magnetic recording system carrying out magnetization in the scanning direction of the recording medium. However, due to "thermal decay" (super paramagnetic effect) in which the magnetized information recorded on the medium is erased by heat, there are limits to making the medium high density. In contrast, a vertical magnetic recording system carrying out magnetization perpendicular to the disk surface of the recording medium is anticipated as the next-generation magnetic recording system that realizes high densification. As a magnetic material for vertical magnetic recording, a cobalt chrome alloy (CoCr) is considered to be effective.

In a hard disk device, the magnetic head flies above the surface of the magnetic disk in accordance with the rotation of the magnetic disk, and carries out magnetic recording without contacting the surface. Hence, the magnetic head and the magnetic disk are prevented from contacting one another at the time of high-speed rotation, and the magnetic disk is prevented from being broken due to the shock such contact would cause. Accompanying the advance of high densification, the flying height of the magnetic head (The distance between the magnetic head and the surface of the magnetic disk) has been gradually decreased. By using a magnetic disk on which a magnetic recording layer or the like is formed on an extremely smooth glass substrate whose mirror surface has been polished, currently, a floating height of 10 nm to 20 nm has been realized.

However, although the track width is narrowing with the advance of further densification, in a conventional servo system in which servo signals are written by being dispersed at intervals, a problem arises in that the magnetic head cannot accurately scan (servo-follow) the tracks. In particular, at a recording density of more than 20 gigabits/inch$^2$, the probability that problems will arise in servo-following is high.

Further, in accordance with the above-described vertical magnetic recording system, although further densification can be attempted, there is the problem that, if the densification progresses, the individually recorded signals become weak and playback gradually becomes more difficult. Therefore, if high density recording is to be carried out with the vertical magnetic recording system, the readability must be improved by further shortening the distance between the magnetic head and the magnetic disk, or the like.

SUMMARY OF THE INVENTION

The present invention aims to solve the problems in the above-described conventional art and to achieve the following objects. Namely, an object of the invention is to provide an information recording method which can carry out high density recording of signals at a good S/N by carrying out recording of data while carrying out tracking servo accurately. Further, another object of the invention is to provide an information recording method which can carry out high density recording by a vertical magnetic recording system.

The above-described objects are achieved by the following means.

According to one aspect of the invention, there is provided an information recording method comprising the steps of: using an information recording medium in which a magnetic recording layer, which comprises a ferromagnetic metallic thin film including vertical magnetic anisotropy, is formed on at least one surface of a disk-shaped support, and in which tracking information is recorded in advance on the magnetic recording layer in accordance with directions that are different from magnetization directions; carrying out tracking with a magneto-optical effect based on the tracking information recorded on the magnetic recording layer; recording data magnetically by applying a magnetic field perpendicular to a disk surface to the magnetic recording layer; and reading the data with a magnetic head.

The information recording method of the invention uses an information recording medium in which a magnetic recording layer, which comprises a ferromagnetic metallic thin film including vertical magnetic anisotropy, is formed on at least one surface of a disk-shaped support, and in which tracking information is recorded in advance on the magnetic recording layer in accordance with directions that are different from magnetization directions. Therefore, by optically tracking by using a magneto-optical effect, accurate tracking servo can be carried out by a simple servo signal as compared with magnetic tracking. Therefore, high-density recording at a good S/N is possible. As a result, recording of signals at a good S/N can be carried out. Further, it is possible to improve the formatting effect by simplifying the servo signal.

The magnetic recording layer of the information recording medium which is used comprises a ferromagnetic metallic thin film having vertical magnetic anisotropy, and tracking by a magneto-optical effect is possible, and vertical magnetic recording of a data signal is possible. Because the writing and the reading of the data signal are the same as in magnetic recording, a recording/reading head is completely the same as in magnetic recording, and it is simple structure. Further, light is used in tracking, but the light is used only for reading the tracking signal. Therefore, the structure can be markedly simplified as compared with the case of light pickup of a magneto-optical disk. Moreover, because recording of data is carried out by the vertical magnetic recording system, the applicability to high recording density, in which recording is stable even in the case of minute recording which is particular to vertical magnetic recording, can be utilized.

In particular, when the magnetic recording layer is magnetized in advance for tracking in a concentric circle form or a spiral form with respect to the center of the disk, and is magnetized such that magnetized regions having different magnetization directions are alternately arranged in a radial direction, and the tracking information is recorded thereon, the tracking can be continuously carried out, and more accurate tracking servo can be carried out.

Note that it is more preferable that the magnetization direction for tracking is perpendicular to the disk surface. Due to the magnetization direction being perpendicular to the disk surface, the magnetized regions, which are alternately arranged in the radial direction and have different magnetization directions, do not weaken each others magnetic forces, and the magnetic force of each magnetized region is stable.

In this case, it is preferable to magnetically record data only on the magnetized regions magnetized in a predetermined magnetization direction. By differentiating the magnetized regions for tracking and the magnetized regions for recording data, there is no need to carry out tracking and recording at the same time for the same part of the magnetized regions, and the degrees of freedom in design are increased, and the accuracy of the tracking servo is improved.

In the above-described information recording medium, when a flexible non-magnetic support is used as the disk-shaped support, the disk-shaped support can stably contact-slide with the magnetic head, and stable head running can be realized. In this case, in order to contact-slide even more stably, the thickness of the flexible non-magnetic support is preferably 10 μm to 200 μm.

In the above-described information recording medium, by providing a magnetic recording layer which is composed by a rare-earth transition metal alloy and whose coercive force in a direction perpendicular to the disk surface is within 1500 Oe to 4000 Oe, vertical magnetic recording can be easily carried out without a heat assist.

As the rare-earth transition metal alloy, alloys containing at least one type of rare-earth metal selected from among terbium, gadolinium, neodymium, and dysprosium, and at least one transition metal of iron and cobalt are preferable. Among such alloys, terbium-iron-cobalt alloy (TbFeCo) or dysprosium-iron-cobalt alloy (DyFeCo) are particularly preferable. Because a flexible non-magnetic support is less heat resistant than a glass substrate or the like, the film-forming temperature of the magnetic recording layer cannot be increased, but the magnetic films of these alloys can obtain sufficient magnetic characteristic when they are formed at about room temperature.

When the rare-earth transition metal alloy contains at least terbium, an alloy whose content of terbium is from 14 to 18 atom % is more preferable. Due to the content of terbium being from 14 to 18 atom %, the vertical direction coercive force of then magnetic recording layer can be within the range of 1500 Oe to 4000 Oe.

Further, the rare-earth transition metal alloy may contain at least one of chromium and nickel. Due to the rate earth transition metal alloy containing chromium or nickel, the corrosion resistance is improved.

Magnetic recording layers may be provided via under layers on the both surfaces of the flexible non-magnetic support, and protective layers protecting the magnetic recording layers may be provided on the magnetic recording layers. It is preferable for the protective layer to have at least one of a hard carbon film having a hardness equivalent to or greater than that of the material of the magnetic head, and a nitride film composed by an inorganic nitride.

For the above-described magnetic recording layer, it is preferable to form, on at least one surface of the flexible non-magnetic support, a magnetic recording layer composed by a rare-earth transition metal alloy having substantially the same composition as a target by sputtering in which a rare-earth transition metal alloy is used as the target. The magnetic characteristics, such as the coercive force, and the film-forming characteristic of the rare-earth transition metal alloy change in accordance with the composition thereof. By sputtering, controlling of the composition is easy, and a magnetic recording layer composed by an alloy having substantially the same composition as the rare-earth transition metal alloy which is the target can be formed. In accordance therewith, information recording media having the same characteristics can be manufactured with good readability, and the recording characteristics thereof are stabilized.

BRIEF DESCRIPTION OF THE DRAWINGS

In FIG. 1A, reference numeral 10 denotes a magnetic disk, and reference numeral 12 denotes a cartridge.

In FIG. 1B, 16A and 16B denote magnetized regions.

In FIG. 1C, reference numeral 14 denotes a support body, 15 denotes an under layer, 16 denotes a magnetic recording layer, 18 denotes a protective layer, and 20 denotes a lubrication film.

FIGS. 3A through 3C are sectional views showing processes of magnetic transfer. In FIG. 3B, reference numeral 22 denotes a slave medium, and 24 denotes a master carrier.

In FIG. 5, reference numeral 32 denotes a floating type slider, 36 denotes a recording magnetic field controlling circuit, and 38 denotes a suspension.

In FIG. 6, reference numeral 40 denotes a floating surface (ABS), 42 denotes a rail pattern, 43 denotes a lens, 44 denotes an optical fiber, 46 denotes an existing section, 50 denotes a magnetic head, and 52 denotes a gimbal.

In FIG. 7, reference numeral 56 denotes a recording mark.

DESCRIPTION OF THE PREFERRED EMBODIMENTS

Hereinafter, embodiments of the present invention will be described while referring to the figures.

(Information Recording Medium)

Figure 1A:
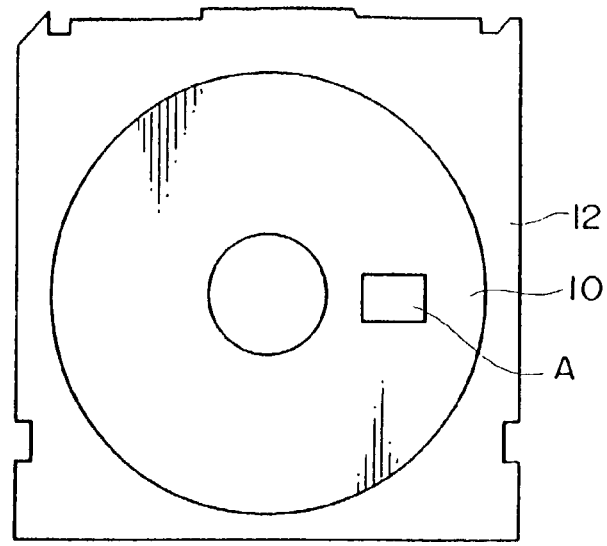
FIG. 1A is a plan view showing a schematic structure of a magnetic disk used in an information recording method of the present invention.

First, a magnetic disk 10 serving as an information recording medium used in the information recording method of the invention will be described. As shown in FIG. 1A, the magnetic disk 10 is a flexible disk in which a center hole is formed at a central portion thereof, and is housed in a cartridge 12 formed of plastic or the like. Note that the cartridge 12 is usually provided with an access window (not shown) covered by a metallic shutter (not shown), and recording onto the magnetic disk 10 and reading from the magnetic disk 10 are carried out via the access window.

Figure 1B:
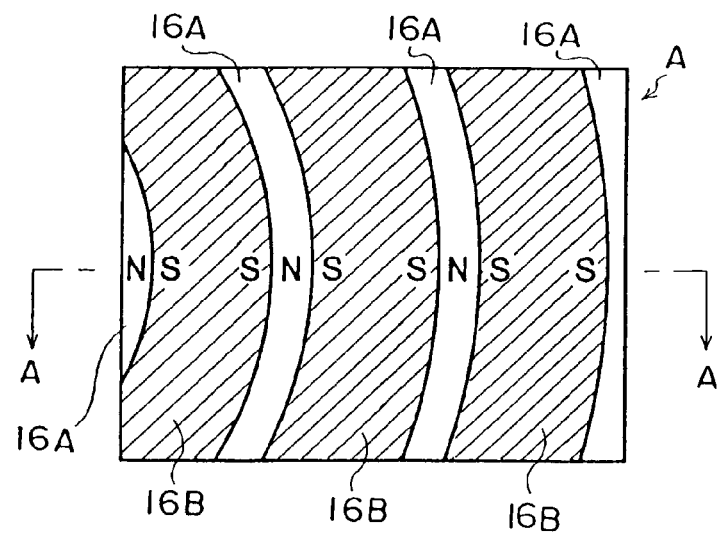
FIG. 1B is a partially enlarged view showing a magnetized state of a surface of a magnetic recording layer of region A of FIG. 1A.
Figure 1C:
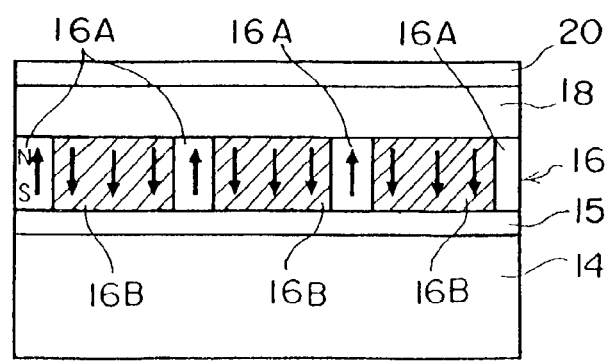
FIG. 1C is a sectional view taken along line A—A of FIG. 1B.

As shown in FIG. 1C, the magnetic disk 10 is formed by laminating an under layer 15 for controlling the magnetic characteristics of a magnetic recording layer 16; the magnetic recording layer 16 which has vertical magnetic anisotropy and is composed of a metallic thin film; a protective layer 18 protecting the magnetic recording layer 16 from deterioration and wear; and a lubrication film 20 for improving the scanning durability and the corrosion resistance by providing a lubricant, in that order on one surface of a disk-shaped support 14 composed of a flexible non-magnetic material. Note that, as will be described later, a reflective layer, or a dielectric layer for controlling the heat conduction and the speed of thermal diffusion may be provided between the support 14 and the under layer 15.

The magnetic recording layer 16 has magnetic anisotropy in a direction perpendicular to the disk surface, and has a magneto-optical effect, and vertical light magnetic recording of data is possible. Further, the magnetic recording layer 16 is magnetized in advance (pre-format-magnetized) in a direction perpendicular to the disk surface. When the surface at a side opposite to the support 14 is a recording surface, the magnetic recording layer 16 is composed of a magnetized region 16A magnetized in a direction in which the support side is the south pole and the recording surface side is the north pole, and a magnetized region 16B magnetized in a direction in which the support side is the north pole and the recording surface side is the south pole.

Further, in FIG. 1B, the magnetized states of the recording surface of the magnetic recording layer 16 at region A of FIG. 1A is shown. Each of the magnetized regions 16A and 16B is formed in concentric circles or in a spiral form with respect to the center of the disk, and each of them makes up a track. These tracks of the magnetized regions 16A and tracks of the magnetized regions 16B are alternately arranged in the radial direction of the disk. Namely, the magnetized regions 16A and the magnetized regions 16B are used as tracking guides and as recording regions in accordance with the differences in the magnetizing directions. Note that in the magnetic disk 10, the recording and reading of data are carried out by making a magnetic head contact from the side of the magnetic recording layer 16.

As will be described later, when recording is carried out on only an S-type magnetized regions 16B and an N-type magnetized regions 16A are used for tracking, the width of the magnetized region 16A for tracking is preferably made to be narrower than the width of the magnetized region 16B for recording. Due to the widened width of the magnetized region 16B for recording, the format efficiency increases. For example, the width of the magnetized region 16A for tracking may be from 0.1 to 0.3 $\mu$m, and the width of the magnetized region 16B for recording may be approximately 1 $\mu$m.

Further, the magnetized regions 16A and 16B may be formed so as to meander at a constant frequency (i.e., may be formed such that a wobble is applied thereto). The meandering frequency of the wobble can be detected, and can be used as a control signal controlling the linear velocity. For example, by inserting a wobble of the same period from an inner periphery to an outer periphery, the linear velocity can be controlled so as to be constant regardless of the radial position. Further, by inserting a wobble to elongate the period is long from the inner periphery to the outer periphery, the angular velocity can be controlled so as to be constant.

Note that in the present embodiment, an example in which the magnetic recording layer 16 is magnetized in a vertical direction in accordance with the tracking information is described. However, the tracking information may be recorded in advance by differences in the magnetizing directions, or the tracking information may be recorded by another method.

The support 14 comprises a flexible non-magnetic material such as a flexible high polymer material or the like in order to absorb the shock when the magnetic head and the magnetic disk contact one another. Examples of the flexible high polymer material are resin films selected from the group consisting of an aromatic polyimide, an aromatic polyamide, an aromatic polyamide imide, polyether ketone, polyether sulfone, polyether imide, polysulfone, polyphenylene sulfide, polyethylene naphthalate, polyethylene terephthalate, polycarbonate, triacetate cellulose, a fluorocarbon resin, or the like.

Further, the support 14 may be used by laminating a same resin film or another resin film. By laminating another resin film, warping or swelling caused by the support itself can be reduced. In accordance therewith, it is possible to reduce the surface blurring at the time of disk rotation, and the frequency and strength of impact of the head and the disk are reduced, and the scratch-resistance of the magnetic recording layer can be markedly improved. Further, because the disk can be handled in a state in which the magnetic recording layer is formed on one side at the time of manufacturing, it is more difficult to scratch the surface and it is more difficult to cause defects due to film meandering than when magnetic recording layers are formed on both sides of the support.

As the laminating method, roll laminating by a heat roller, laminating by plate heat press, or the like can be used. Examples of the method of providing an adhesive are a method of laminating by applying an adhesive on an adhesion surface, a method using an adhesion sheet in which an adhesive is applied on a releasing paper in advance, or the like. The type of adhesive is not particularly limited, and a general hot melt adhesive, a heat-curable adhesive, a UV-curable adhesive, an EB-curable adhesive, a pressure sensitive adhesive sheet, an anaerobic adhesive, or the like can also be used.

The thickness of the support 14 is from 10 $\mu$m to 200 $\mu$m, and preferably from from 20 $\mu$m to 150 $\mu$m, and more preferably from 25 $\mu$m to 80 $\mu$m. If the thickness of the support 14 is thinner than 10 μm, the stability at the time of high-speed rotation deteriorates, and surface blurring increases. On the other hand, if the thickness of the support 14 is thicker than 200 μm, the rigidity at the time of rotation increases, stable contact-sliding becomes difficult, and jumping of the magnetic head is caused about.

When b=10 mm, the stiffness of the support 14 expressed by the following equation is preferably within a range of 0.5 kgf/mm² to 2.0 kgf/mm², and more preferably within a range of 0.7 kgf/mm² to 1.5 kgf/mm².

Stiffness of support=$Ebd^3/12$

Note that, in this equation, E represents Young's modulus, b represents the width of the film, and d represents the thickness of the film.

The surface of the support 14 is preferably as smooth as possible in order to facilitate recording with the magnetic head. Unevenness of the surface of the support 14 markedly deteriorates the recording/reading characteristics of the signal. Specifically, when an undercoat layer, which will be described in detail later, is used, the surface roughness (central surface average roughness SRa) measured by an optical-type surface roughness meter is 5 nm or less, and preferably 2 nm or less, and the projection height measured by a stylus-type surface roughness meter is 1 μm or less and preferably 0.1 μm or less. When an undercoat layer is not used, the surface roughness (central surface average roughness SRa) measured by an optical-type surface roughness meter is 3 nm or less, and preferably 1 nm or less, and the projection height measured by a stylus-type surface roughness meter is 0.1 μm or less and preferably 0.06 μm or less.

On the surface of the support, the undercoat layer is preferably provided for the purpose of improving the planarity. In order to form the magnetic recording layer 16 by sputtering or the like, the undercoat layer preferably possesses excellent heat resistance. As the material of the undercoat layer, for example, a polyimide resin, a polyamide imide resin, a silicon resin, a fluorine containing resin, or the like can be used. Heat-curable polyimide resins and heat-curable silicon resins have a good smoothening effect, and are particularly preferable. The thickness of the undercoat layer is preferably from 0.1 μm to 3.0 μm. When the support 14 is laminated with another resin film, the undercoat layer may be formed before laminating processing, or the undercoat layer may be formed after laminating processing.

As the heat-curable polyimide resin, a polyimide resin obtained by thermally polymerizing an imide monomer having two or more terminal unsaturated radicals in the molecule thereof, such as, for example, as bisallylnajiimide "BANI" manufactured by Maruzen Petrochemical, Co., Ltd. can be suitably used. Because this imide monomer can be thermally-polymerized at a relatively low temperature after being applied to the surface of the support in a monomer state, the monomer that is the raw material can be directly applied on the support and hardened. Further, the imide monomer can be used after being dissolved in a general-purpose solvent, and has excellent produceability and workability. Further, because the molecular weight and the solution viscosity thereof is low, the monomer solution penetrates in well among the indentations and projections at the time of application, and the smoothening effect is good.

As the heat-curable silicon resin, it is preferable to use a silicon resin in which a silicon compound with an organic radical, is polymerized as a raw material by a sol-gel method. The silicon resin is composed by a structure in which a portion of the bonds of silicon dioxide is replaced with an organic radical. Because the silicon resin has much better heat resistance than silicon rubber and has better flexibility than a silicon dioxide film, even if a resin film is formed on the support composed by a flexible film, it is difficult for cracks and peeling to occur. Further, because the monomer used as the raw material can be directly applied on the support and hardened, a general-purpose solvent can be used, the monomer solution penetrates in well among the indentations and projections, and the flattering effect is good. Moreover, because the condensation polymerizing reaction progresses from a relatively low temperature by adding a catalyst such as an acid, a chelating agent, or the like, it can be hardened in a short time, and a resin film can be formed by using a general purpose applying device.

At the surface of the undercoat layer, for the purposes of decreasing the actual contact area of the magnetic head and the magnetic disk and improving the sliding characteristic, it is preferable to provide micro-projections (texture). Further, by providing the micro-projections, the handling performance of the support also is good. As a method of forming the micro-projections, a method of applying spherical silica particles, a method in which projections of an organic matter are formed by applying an emulsion, or the like can be used. However, in order to ensure the heat resistance of the undercoat layer, it is preferable to form the micro-projections by applying spherical silica particles.

The height of the micro-projections is preferably from 5 nm to 60 nm, and more preferably from 10 nm to 30 nm. If the height of the micro-projections is too high, the recording/reading characteristics of signal deteriorates due to the spacing loss between the recording/reading head and the medium, and if the micro-projections are too short, the effect of improving the sliding characteristic is low. The density of the micro-projections is preferably from 0.1 to 100 micro-projections/μm², and more preferably from 1 to 100 micro-projections/μm². When the density of the micro-projections is too low, the effect of improving the sliding characteristic is low, and when the density is too high, tall projections increase due to an increase in cohering particles and the recording/reading characteristic deteriorates.

Further, the micro-projections can be fixed on the surface of the support by using a binder. As the binder, a resin having sufficient heat resistance is preferably used. As the resin having heat resistance, it is particularly preferable to use a heat-curable polyimide resin or a heat-curable silicon resin.

Between the support 14 and the magnetic recording layer 16, in order to improve the accuracy of reading the tracking signal by a recording signal or light, a reflecting film can be provided in the same way as a general magneto-optical disk. As the reflecting film, a light reflecting substance having a high reflectance ratio with respect to laser light is used. Examples of such a light reflecting substance are metals and semimetals such as, for example, Al, Al—Ti, Al—In, Al—Nb, Al—Ta, Au, Ag, Cu, and the like. A single one of these substances may be used, or two or more may be used in combination. Further, these substances may be used as alloys. This reflecting film can be formed by sputtering or electron beam vacuum depositing the above-described light reflecting substance on the support 14. The film thickness of the reflecting film is preferably from 10 nm to 200 nm.

For the purpose of improving the recording characteristic and the corrosion resistance of the magnetic recording layer 16, it is preferable to provide the under layer 15 between the support 14 and the magnetic recording layer 16. A rare-earth transition metal alloy used for the magnetic recording layer is generally an amorphous vertical magnetic recording film, and the magnetic interaction within the recording film is extremely strong. In a magneto-optical disk, recording is carried out in a state in which the coercive force and interaction are weakened by heating by laser light. However, in a case of writing tracking signal by a magnetic transfer method or of attempting to record one part of a signal by a magnetic head, it easily becomes recording in a magnetic wall moving mode by only the magnetic recording layer composed by a rare-earth transition metal alloy, and problems such as magnetization inversion, loud noise, and the like arise. Therefore, by providing the appropriate surface roughness or a crystal structure at the under layer 15, a magnetic domain within the magnetic recording layer can be easily generated, and the recording can be made be magnetic recording in a spin inversion mode.

Examples of the under layer 15 are metals such as titanium, aluminium, chrome, nickel, or the like, or alloys of these metals and other metals, phosphorus compounds such as nickel phosphide and the like, carbons such as a graphite, amorphous carbon, and the like. Further, the dielectric materials described later can be used. The under layer 15 can be prepared by a so-called vacuum film forming method such as a sputtering method, a vacuum deposition method, a CVD method, or the like. At this time, there is the need to provide the appropriate surface roughness and crystal structure by adjusting film forming conditions and the film thickness. The surface roughness is preferably, as Rmax, about from 5 to 20 nm, and the particle size is preferably about from 1 to 30 nm. The film thickness is preferably from 10 nm to 200 nm.

A dielectric layer may be provided between the support 14 and the under layer 15. The dielectric layer controls the temperature of the magnetic recording layer 16 at the time of irradiating a laser and after irradiating a laser, and shields substances, such as moisture or oxygen which relates to corrosion or oxidation of the magnetic recording layer 16, from moving from the support side. A dielectric material generally used for magneto-optical recording can be used as the dielectric layer.

Examples of the dielectric material are, for example, oxides of silica, alumina (Si—O, Al—O), or the like, nitrides such as silicon nitride, aluminum nitride (Si—N, Al—N), or the like, sulfides such as zinc sulfide (Zn—S) or the like, phosphides such as nickel phosphide or the like, tantalum silicide (Ta—Si), carbons such as graphite, amorphous carbon or the like. However, materials which are corrosion-resistant and suppress the reaction of oxygen and the metal material contained in the magnetic recording layer and have high heat conductivity are preferable, and inorganic nitrides such as silicon nitride (Si—N), aluminum nitride (Al—N), or the like, and carbons are particularly preferable. This dielectric layer can be formed by a sputtering method, a chemical vapor deposition method (CVD method), or the like. The film thickness of the dielectric layer is preferably from 10 nm to 200 nm.

Further, when the magnetic disk 10 is used in combination with a single pole magnetic head, a lining layer comprising a soft magnetic material may be provided between the under layer 15 and the magnetic recording layer 16. Permalloy, Sendust, or the like can be uses as the soft magnetic material. The film thickness of the lining layer is preferably from 50 nm to 500 nm, and more preferably from 100 nm to 300 nm.

As the magnetic recording layer 16, a material having vertical magnetic anisotropy among magnetic recording materials such as various types of metal alloys generally used for magneto-optical disks is used. Examples of such a magnetic recording material are rare-earth transition metal alloys. A rare-earth transition metal alloy has vertical magnetic anisotropy, and enables vertical magnetic recording, and the magnetic characteristic thereof is excellent. Further, because a rare-earth transition metal alloy is non-crystalline (amorphous), noise due to crystal grains do not arise. Further, the magnetostatic characteristic and the magneto-optical characteristic can be controlled in a broad range in accordance with the composition. Further, the Curie point of the magnetic recording material is preferably about 200° C.

At the magnetic recording layer 16, the coercive force (vertical direction coercive force) in a direction perpendicular to the disk surface is within a range of 1500 Oe to 4000 Oe. When the vertical direction coercive force is less than 1500 Oe, a sufficient electromagnetic conversion characteristic cannot be obtained, and when the vertical direction coercive force exceeds 4000 Oe, it is difficult to carry out magnetic recording without a heat assist. In consideration of the balance between the stabilization of magnetic force and the ease of magnetic recording, the vertical direction coercive force is preferably in a range of 2000 Oe to 3500 Oe, and is more preferably in a range of 2500 Oe to 3000 Oe.

As the rare-earth transition metal alloy, alloys containing at least one type of rare earth metal selected from among terbium (Tb), gadolinium (Gd), neodymium (Nd), and dysprosium (Dy) such as TbCo, TbFe, TbFeCo, NdFeCo, GdFeCo, DyFeCo, TbGdFe, TbNdFe, TbGdFeCo, or the like, and at least one transition metal of iron (Fe) and cobalt (Co) are preferable. Further, in order to improve the corrosion resistance of these alloys, chromium (Cr) or nickel (Ni) may be appropriately added. Moreover, for the purpose of assisting formation of the magnetic domain, silicon (Si), boron (B), or the like may be added.

Among the above-describe alloys, TbFeCo and DyFeCo are particularly preferable. Because a flexible non-magnetic support is less heat resistant than a glass substrate or the like, the film-forming temperature of the magnetic recording layer cannot be increased, but the magnetic films of these alloys can obtain sufficient magnetic characteristic when they are formed at about a room temperature.

Figure 2:
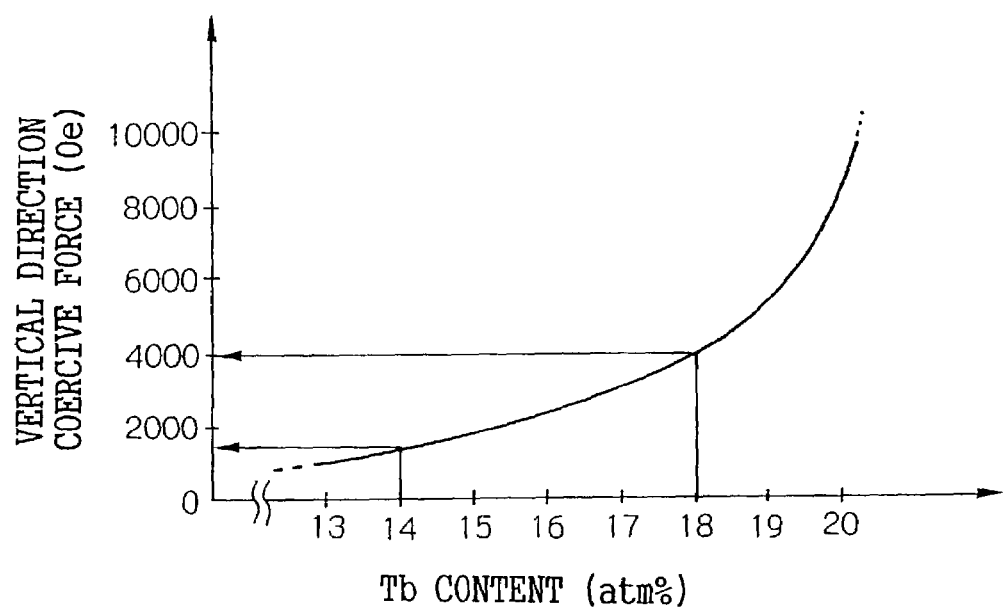
FIG. 2 is a graph showing the relationship between a content of terbium and a vertical direction coercive force of the magnetic recording layer.

Further, when the rare-earth transition metal alloy contains terbium, as shown in FIG. 2, the vertical direction coercive force increases in accordance with the increase in the content of terbium. When the content of terbium is from 14 to 18 atom %, the vertical direction coercive force is within 1500 Oe to 4000 Oe, and an excellent recording characteristic can be obtained when vertical magnetic recording is carried out.

Examples of a method of preparing the magnetic recording layer 16 are physical vapor deposition methods (PVD methods) such as a vacuum deposition method, a sputtering method, an ion plating method and an ion-injection method, and a chemical vapor deposition method (CVD method), and the like. However, because composition control is easy, the sputtering method is particularly preferable. By sputtering the rare-earth transition metal alloy to be coated as a target, a magnetic film composed by an alloy of a composition, which is substantially the same as the target can be formed.

As the method of sputtering, other than general DC sputtering and RF sputtering, DC pulse sputtering, RF bias sputtering, reactive sputtering, or the like can be used. At the time of sputtering, either a common sputtering method in which, with the structural elements being independent targets, the substrate is made rotate on these targets and pass through, or a method in which one portion or the entirety thereof is structured as the alloy target and sputtered, can be used. Further, although there are the problems of element distribution and readability, a sputtering method can be used in which alloying is carried out by providing a chip or a sheet composed by the elements which are desired to be introduced at one part of the basic target. The film thickness of the magnetic recording layer 16 is preferably from 10 nm to 100 nm, and particularly preferably from 20 to 50 nm.

In this way, a vertical magnetic recording layer composed by a rare-earth transition metal alloy can be prepared by a sputtering method, and film forming can be carried out at room temperature. Therefore, regardless of the fact that a flexible non-magnetic support is used, there is no substrate deformation, and the planarity is excellent.

The method of recording the tracking signal on the magneto-optical disk, namely, the method of pre-formatting the magnetic recording layer 16, is not particularly limited. For example, the magnetized region may be written by a magnetic head, or the magnetized region may be formed by magnetic transfer. In order to form a magnetic region having a detailed pattern in a short time, it is particularly preferable to form the magnetized region by magnetic transfer.

As shown in FIG. 3A through FIG. 3C, magnetic transfer is a method in which a magnetized region having a predetermined pattern is formed by transferring magnetism from a master carrier 24 on which magnetic layers 28 are formed to a slave medium 22 having the magnetic recording layer 16 before being magnetized. The master carrier 24 is structured such that the convex-shape magnetic layers 28, which are composed by strong magnetic bodies such as Co, Fe, or the like formed in accordance with the transfer pattern and having a large magnetic flux density, are formed on a substrate 26 structured from a non-magnetic material such as silicon, aluminium, or the like. Between the substrate 26 and the magnetic layers 28, a conductive layer composed by a non-magnetic metallic material such as Cr, Ti or the like can be provided as needed. The master carrier 24 can be prepared by using a photo-application or a stamper used for forming the substrate of an optical disk. For example, the master carrier 24 can be obtained by forming a magnetic layer on a nickel substrate on which a predetermined pattern is formed by a stamper. Hereinafter, the method of forming the magnetic region by magnetic transfer will be specifically described.

First, as shown in FIG. 3A, by applying a direct current magnetic field in the direction of arrow A to the slave medium 22 in which the under layer 15, the magnetic recording layer 16 before being magnetized, a protective layer (not shown), and a smoothing layer (not shown) are laminated on one surface of the support 14, the magnetic recording layer 16 of the slave medium 22 is energized in the direction of arrow A (initial magnetization). Note that the magnetic recording layer 16 is initially magnetized, and the entirety thereof becomes the magnetized region 16A.

Next, as shown in FIG. 3B, the master carrier 24 is tightly fit to the initially-magnetized slave medium 22, and by applying a d.c. magnetic field or an a.c. bias magnetic field or the like in the direction of arrow B as a transferring magnetic field, the magnetic layer 28 is energized in the direction of arrow B. In accordance therewith, as shown in FIG. 3C, a magnetic field in the direction of arrow B is applied from the portion at which the slave medium 22 and the magnetic layer 28 contact to the portion to which the magnetic recording layer 16 corresponds. The magnetizing direction of this portion is reversed, and a magnetized region 16B is formed in a magnetized region 16A. In accordance therewith, precise pre-formatting of the slave medium 22 is carried out.

The protective layer 18 is provided in order to prevent the metallic material contained in the magnetic recording layer 16 from corroding, to prevent wear due to the magnetic head and the magnetic disk dummy contacting or contact sliding, and to improve the running durability and the corrosion resistance. Because rare-earth transition metal alloys corrode extremely easily, when a rare-earth transition metal alloy is used, it is particularly preferable to provide the protective layer 18.

Materials, oxides such as silica, alumina, titania, zirconia, cobalt oxide, nickel oxide, and the like, nitrides such as titanium nitride, silicon nitride, boron nitride, and the like, carbides such as silicon carbide, chromium carbide, boron carbide, and the like, and carbons such as graphite, amorphous carbon and the like, can be used in the protective layer 18.

The protective layer 18 is a hard film having hardness equivalent to or greater than that of the material of the magnetic head. A hard film, in which it is difficult for seizing to occur at the time of sliding and whose effects are stably maintained, has excellent sliding resistance, and is preferable. Further, at the same time, a hard film, which has few pinholes has excellent corrosion resistance and is more preferable. Moreover, in order to precisely carry out reading of the tracking signal by a laser, the hard film preferably has sufficient transparency with respect to the laser, which is used. An example of such a protective film is a hard carbon film called DLC (Diamond Like Carbon) prepared by the CVD method.

The protective layer 18 can be structured such that two or more types of films having different characteristics are laminated. For example, by providing a hard carbon protective film for improving the sliding characteristic at the surface side and by providing a nitride protective film such as silicon nitride or the like for improving the corrosion resistance at the magnetic recording layer side, it is possible to obtain high levels of both corrosion resistance and durability.

In order to improve the running durability and the corrosion resistance, it is preferable to provide the lubrication film 20 on the protective layer 18. A lubricant such as a well-known hydrocarbon lubricant, fluorocarbon lubricant, an extreme-pressure additive, or the like is used as the lubrication film 20.

Examples of the hydrocarbon lubricant are carboxylic acids such as stearic acid, oleic acid, or the like, esters such as butyl stearate or the like, sulfonic acids such as octadecyl sulfonic acid or the like, phosphoric acid esters such as phosphoric acid mono-octadecyl or the like, alcohols such as stearyl alcohol, oleyl alcohol, or the like, carboxylic acid amides such as amide stearate or the like, and amines such as stearyl amine or the like.

Examples of the fluorocarbon lubricant are lubricants in which some or all of the alkyl groups of the above-described hydrocarbon lubricant are substituted with fluoroalkyl groups or perfluoro polyether groups. The perfluoro polyether group is perfluoro methylene oxide polymer, perfluoro ethylene oxide polymer, perfluoro-n-propylene oxide polymer $(CF_2CF_2CF_2O)_n$, perfluoro isopropylene oxide polymer $(CF(CF_3)CF_2O)_n$, or copolymers thereof. A specific examples is perfluoro methylene-perfluoro ethylene copolymer (manufactured by Ausimont SpA, trade name "FOMBLIN Z-DOL") having a hydroxyl group at the end of the molecule weight, or the like.

Examples of the extreme-pressure additive are phosphoric esters such as a trilauryl phosphate or the like, phosphorous esters such as a trilauryl phosphite or the like, thiophosphorous esters or thiophosphoric esters such as a trithio trilauryl phosphite or the like, sulfur-based extreme pressure agents such as dibenzyl disulfide or the like, and the like.

A single one of or a plurality of the above-described lubricants can be used. It suffices that a solution, in which the lubricants are dissolved in an organic solvent, is applied on the surface of the protective layer 18 by the spin coating method, the wire-bar coating method, the gravure coating method, the dip coating method, or the like, or is applied on the surface of the protective layer 18 by the vacuum deposition method. The coated amount of the lubricants is preferably 1 to 30 mg/m$^2$, and is particularly preferably 2 to 20 mg/m$^2$.

Further, in order to further increase the corrosion resistance, it is preferable to use a rust-preventive agent at the same time. Examples of the rust-preventive agent are nitrogen-containing heterocyclic ring groups such as benzotriazole, benzimidazole, purine, pyrimidine, or the like, and derivatives in which an alkyl side chain or the like is introduced in the mother nuclei thereof, nitrogen- and sulfur-containing heterocyclic ring groups such as benzothiazole, 2-mercapton benzothiazole, tetrazainden ring compounds, thiouracil compounds, or the like and derivatives thereof, and the like. These rust-preventive agents may be mixed into the lubricant and coated on the protective layer 18, or may be coated on the protective layer 18 before the lubricant is coated and the lubricant may be coated thereon. The coating amount of the rust-preventive agent is preferably 0.1 to 10 mg/m$^2$, and particularly preferably 0.5 to 5 mg/m$^2$.

(Tracking Servo)

Figure 4A:
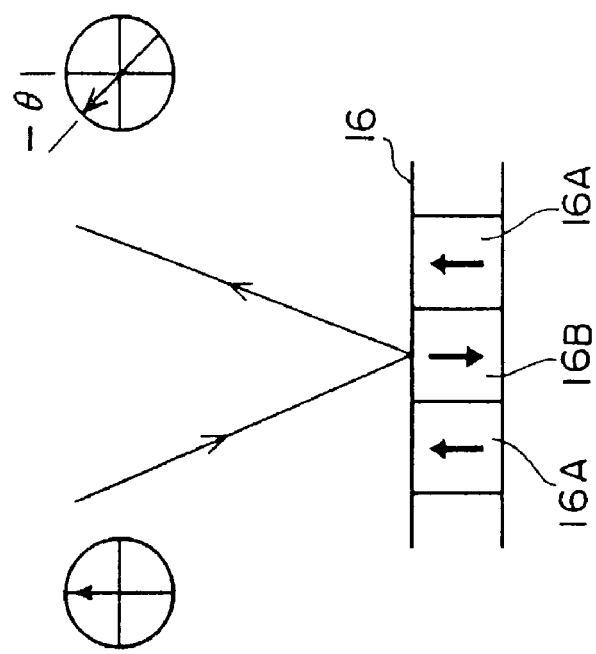
FIGS. 4A and 4B arc explanatory diagrams explaining the principles of reading a tracking signal.
Figure 4B:
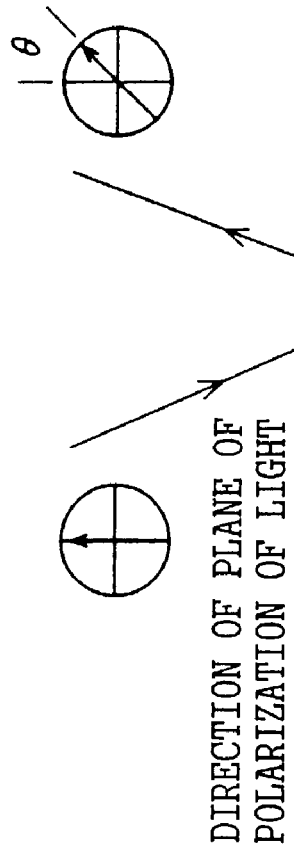

Next, a method of the tracking servo in the above-described magnetic disk will be described. As shown in FIG. 4A, if linear porarized light is irradiated onto the magnetized region 16A magnetized in a direction in which the support side is the south pole and the recording surface side is the north pole, the plane of polarization of the reflected light rotates (to the right for example) by a predetermined angle θ from the plane of polarization of the incident light due to the magnetic Kerr effect. On the other hand, as shown in FIG. 4B, if the same linear polarized light is irradiated to the magnetized region 16B magnetized in a direction in which the support side is the north pole and the recording surface side is the south pole, the plane of polarization of the reflected light rotates (to the left for example) by a predetermined angle −θ from the plane of polarization of incident light due to the magnetic Kerr effect.

Accordingly, the light beam irradiated to the magnetized regions is reflected at the magnetic disk 10. However, reflected light, whose plane of polarization has been rotated by a predetermined angle from this reflected light through a polarizing plate or the like, is detected. The relative offset of the head and the track is detected by the strength of the reflected light, the tracking servo can be carried out. Namely, the magnetized region 16A and the magnetized region 16B provided in concentric circles or in a spiral form function as tracking guides. In this way, by carrying out light tracking by using the magneto-optical effect, as compared with carrying out magnetic tracking, accurate tracking servo can be carried out by simple servo signal. Further, it is possible to increase formatting efficiency by simplifying the servo signal.

A tracking error detecting system used in optical disks such as a triple-beam method, or a push-pull method in which a tracking error signal is obtained by using a half-split photodetector, or the like, can be used as the tracking error detecting system. In order to obtain a sufficient tracking error signal, the triple-beam method is preferable. With respect to a focus servo using light, focusing by piezo elements may be carried out as in the case of current magneto-optical disk devices. However, in the tracking system of the present embodiment, because a flying head extremely precisely follows the disk, it is possible to omit a focus servo mechanism. This is extremely advantageous for making a drive device be compact and thin. Further, because a light beam is used for only the tracking servo, a low power output laser light source such as an infrared radiation laser or the like can be used as the light source for tracking.

(Recording/Reading of Data)

Figure 5:
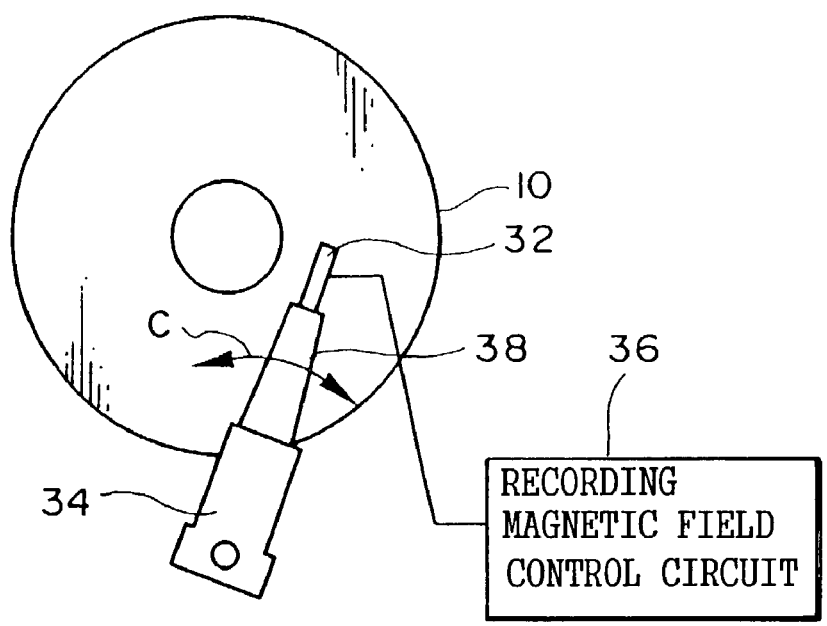
FIG. 5 is a plan view showing a schematic structure of a magnetic disk recording/reading device.

Next, a method of recording data on the magnetic disk described above and a method of reading the recorded data will be described. A schematic structure of the recording/reading device which can be used for recording data on the above-described magnetic disk and for reading recorded data is shown in FIG. 5. A schematic structure of a recording/reading head portion of the recording/reading device is shown in FIG. 6.

Figure 6:
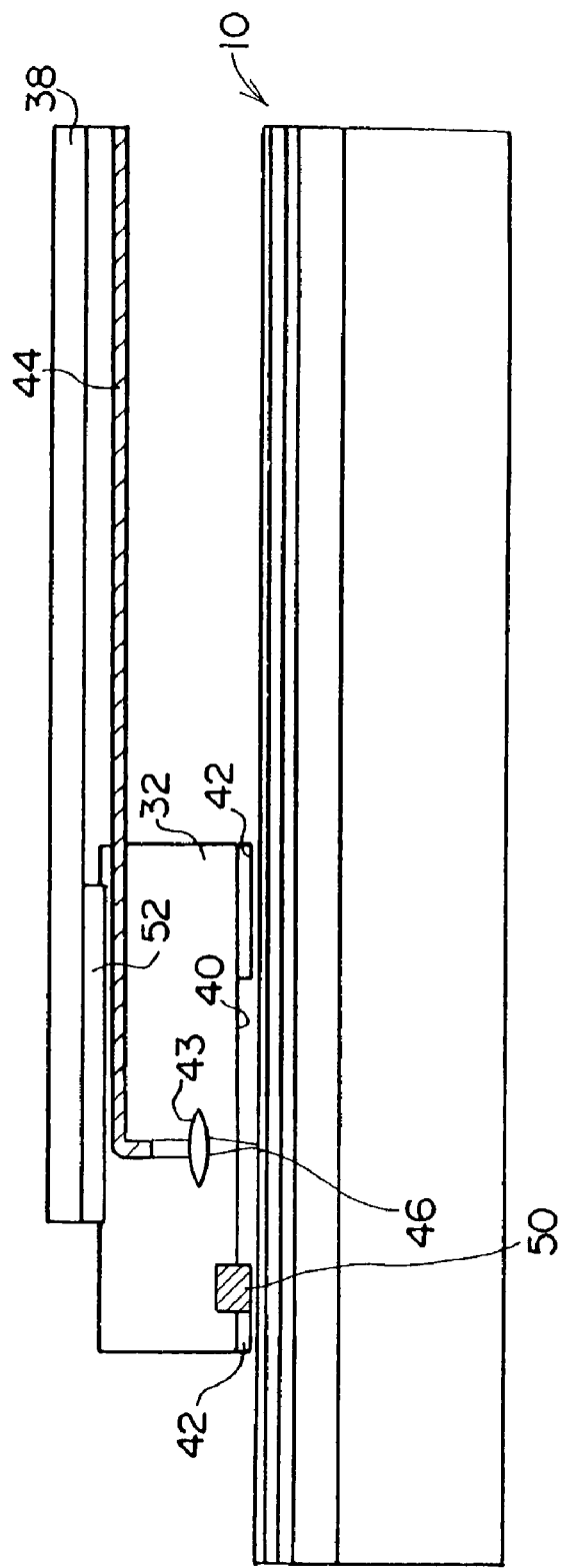
FIG. 6 is a sectional view taken along the optical axis, and which shows a schematic structure of a head portion of the magnetic disk recording/reading device.

As shown in FIG. 5 and FIG. 6, this recording/reading has a floating type slider 32 which is mounted to the distal end of a swing arm 34 and which floats as the magnetic disk 10 rotates. The floating type slider 32 is mounted to the bottom surface of a gimbal 52 which is fixed to the distal end portion of a suspension 38 and is a thin plate spring. The suspension 38 is supported by the swing arm 34. Further, the floating type slider 32 is disposed above the recording surface of the magnetic disk 10 such that a floating surface (ABS: Air Bearing Surface) 40 thereof faces the recording surface of the magnetic disk 10. The floating type slider 32 is movable in the radial direction of the magnetic disk 10 due to rotation of the swing arm 34 along the direction of arrow C.

As shown in FIG. 6, the head portion of the recording/reading device has the floating type slider 32 which floats as the magnetic disk 10 rotates, and a rail pattern 42 for providing positive pressure or negative pressure is provided on the air bearing surface 40. At the air bearing surface 40 of the floating type slider 32, a light exiting portion 46 irradiating laser light for tracking is provided. An optical fiber 44 is provided parallel to the suspension 38. Laser light exiting from a laser light source (not shown) disposed outside is led by the optical fiber 44, and is condensed by a lens 43, and exits from the light-exiting portion 46. Further, a magnetic head 50 having a exciting coil is provided at the air bearing surface 40. The magnetic head 50 is connected to a recording magnetic field control circuit 36 controlling the magnetic field to be applied at the time of recording data.

A magnetic head such as an MR (Magneto Resistive) head, a GMR (Giant Magneto Resistive) head, a TMR (Tunnel Magneto Resistive) head, or the like, which utilize the magneto-resistance effect in which electrical resistance changes in correspondence to the strength of magnetic field, can be used as the magnetic head 50. Among them, the high sensitivity GMR head and TMR head are particularly preferable. Note that the vertical magnetic recording can be carried out by using either of a vertical magnetic recording head such as a single pole magnetic head or the like fabricated for vertical magnetic recording, or a ring head used in a longitudinal magnetic recording system. However, when a single pole magnetic head is used, as described previously, it is preferable to provide the lining layer.

When the magnetic disk 10 is made to rotate and the floating type slider 32 is pushed against the magnetic disk 10, the magnetic disk 10 and the floating type slider 32 stably contact-slide by an extremely weak power. For stable running of the head, the number of rotations of the disk is preferably 1000 rpm to 10000 rpm, and more preferably 2000 rpm to 7500 rpm. Further, surface runout of the disk is preferably small, and is more preferably made to be about 50 µm or less.

At the time of recording data, in this state of stable contact-sliding, a control signal is supplied from the recording magnetic field control circuit 36 to the magnetic head 50, and recording of data is magnetically carried out by applying to the magnetic recording layer 16 a magnetic field corresponding to the data. At this time, it is possible to carry out recording of data on one portion of the magnetized regions by dividing the magnetized regions into magnetized regions for tracking and magnetized regions for recording data, such as, for example, recording only on the S-type magnetized regions 16B and using the N-type magnetized regions 16A for tracking. By differentiating the magnetized regions for tracking and the magnetized regions for recording data, there is no need to carry out tracking and recording at the same time for the same part of the magnetized regions. In accordance therewith, the degrees of freedom in design are increased such as low output laser light is used for tracking and the magnetic head is used for recording. Further, there is no need for tracking to be carried out on the recording regions, and the accuracy of the tracking servo is improved.

Figure 7:
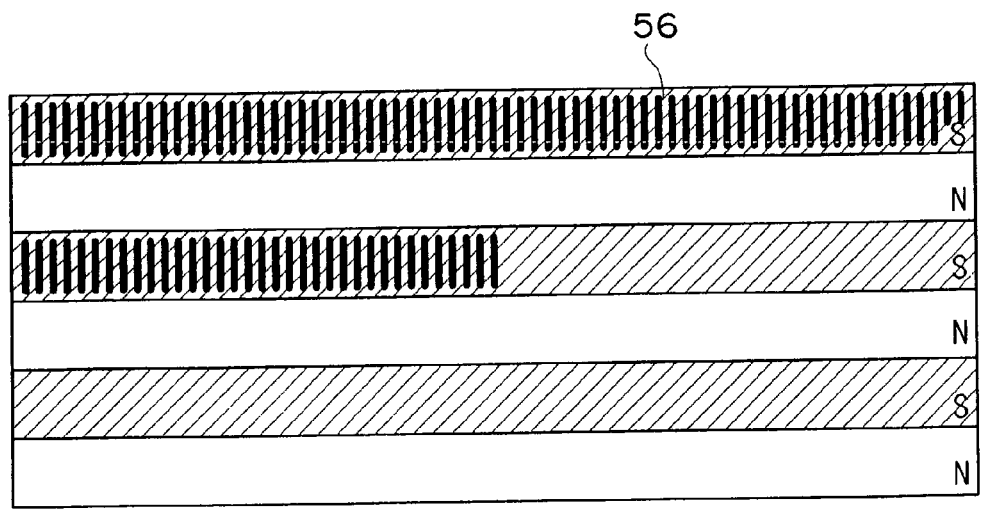
FIG. 7 is a plan view showing a recording pattern after the recording of data.

After recording, as shown in FIG. 7, a recording marks 56 of the magnetic head are continuously recorded along the magnetized region 16B. Further, at the time of reading data, the magnetically-recorded recording signal can be read by using the magnetic head 50.

As described above, in the present embodiment, the magnetic recording layer of the magnetic disk, which is used is magnetized in advance such that the magnetized regions whose magnetized directions are different are alternately arranged in a radial direction. Therefore, tracking can be optically carried out on the basis of the difference in the magnetized directions of the magnetized regions, namely, by utilizing magnetic Kerr effect. In accordance therewith, as compared with magnetic tracking, accurate tracking servo can be carried out by a simple servo signal. As a result, recording of signals can be carried out at an excellent S/N. Further, due to the servo signal being simplified, it is possible to improve the formatting efficiency. Moreover, because the light used for tracking is used only for reading the tracking signal, the structure of light pickup is markedly simplified as compared with the case of a magneto-optical disk.

Further, because the magnetic recording layer of the magnetic disk to be used is composed by a ferromagnetic metallic thin film having vertical magnetic anisotropy, the data can be recorded on the magnetized region of the magnetic recording layer by vertical magnetic recording, and high density recording of a data signal can be carried out. Further, when vertical magnetic recording is carried out, recording bits having different magnetization directions are adjacent to one another, and the magnetic forces do not weaken each other, and the effect of stabilizing the magnetic force of the recording region can be obtained.

Further, when the magnetic recording layer is magnetized in advance for tracking in a concentric circle form or a spiral form with respect to the center of the disk, tracking can be continuously carried out, and more accurate tracking servo can be carried out. Moreover, due to the magnetization direction for tracking being perpendicular to the disk surface, the magnetized regions, which are alternately arranged in the radial direction and have different magnetization directions, do not weaken each others magnetic forces, and the magnetic force of each magnetized region is stable.

In the present embodiment, because the writing (recording) and reading of the data signal are carried out by magnetic recording, a head having a simple structure which is completely the same as in magnetic recording can be used as the recording/reading head.

In the present embodiment, because a flexible non-magnetic support is used as the disk-shaped support, the disk-shaped support can stably contact-slide with the magnetic head, and stable head running can be realized.

Further, by providing the magnetic recording layer which is composed by a rare-earth transition metal alloy and whose coercive force in a direction perpendicular to the disk surface is within 1500 Oe to 4000 Oe, vertical magnetic recording can be easily carried out without a heat assist. When a TbFeCo or DyFeCo alloy is used as the rare-earth transition metal alloy, a magnetic recording layer having a sufficient magnetic characteristic can be formed by sputtering at about room temperature.

Note that, in the above-described embodiment, an example in which the magnetic disk is housed in a cartridge and is used as a flexible disk was described. However, the information recording medium of the invention can be applied to a hard disk. When it is applied to a hard disk, a support having a relatively high hardness such as an aluminum substrate, a glass substrate, a polycarbonate substrate, a carbon substrate, or the like is used, and the thickness of the support is preferably from 0.2 mm to 1.2 mm, and more preferably from 0.3 mm to 0.9 mm.

In the above-described embodiment, although an example in which tracking is carried out by irradiating laser light from the side of the magnetic recording layer was described, a structure may be used in which tracking is carried out by irradiating laser light from the side of the substrate. In this case, a material having high transmissivity with respect to laser light of the predetermined wavelength used for recording and reading is used as the support.

Further, in the above-described embodiment, an example in which the magnetic recording layer is provided on one side of the support was described. However, the magnetic recording layer may be provided on both sides of the support. Further, supports, in which the magnetic recording layer is provided on one side, may be adhered together such that the support sides face inward, and magnetic recording layers may be provided on both sides of the disk.

The information recording method of the invention achieve the effect that, by carrying out recording of data while accurately carrying out tracking servo, high density recording of signals can be carried out at a good S/N. Further, the information recording method of the invention achieves the effect that high-density recording can be carried out by a vertical magnetic recording system.

What is claimed is:

1. An information recording method comprising:
    using an information recording medium in which a magnetic recording layer, which comprises a ferromagnetic metallic thin film including vertical magnetic anisotropy, is formed on at least one surface of a disk-shaped support, and in which tracking information is recorded in advance on the magnetic recording layer in accordance with directions that are different from magnetization directions;
    carrying out tracking with a magneto-optical effect based on the tracking information recorded on the magnetic recording layer;
    recording data magnetically by applying a magnetic field perpendicular to a disk surface to the magnetic recording layer; and reading the data with a magnetic head,
  wherein the magnetic recording layer is magnetized in advance for tracking in one of a concentric circle form and a spiral form with respect to the center of the disk, and is magnetized such that magnetized regions comprising different magnetization directions are alternately arranged in a radial direction, and the tracking information is recorded thereon.

2. The information recording method according to claim 1, wherein the information recording medium is formed by laminating at least an under layer, the magnetic recording layer, a protective layer, and a lubrication film, in that order, on at least one surface of the disk-shaped support.

3. The information recording method according to claim 1, wherein the disk-shaped support comprising a substrate selected from the group consisting of an aluminum substrate, a glass substrate, a polycarbonate substrate, and a carbon substrate, and a thickness of the support is from 0.2 mm to 1.2 mm.

4. The information recording method according to claim 1, wherein the tracking information is recorded in advance by applying an external magnetic field to a master carrier, which possesses indentations and projections corresponding to the tracking information with a soft magnetic layer formed thereon, while the master carrier is in contact with the information recording medium.

5. An information recording method comprising:
  using an information recording medium in which a magnetic recording layer, which comprises a ferromagnetic metallic thin film including vertical magnetic anisotropy, is formed on at least one surface of a disk-shaped support, and in which tracking information is recorded in advance on the magnetic recording layer in accordance with directions that are different from magnetization directions;
  carrying out tracking with a magneto-optical effect based on the tracking information recorded on the magnetic recording layer;
  recording data magnetically by applying a magnetic field perpendicular to a disk surface to the magnetic recording layer; and
  reading the data with a magnetic head,
  wherein the magnetic recording layer is magnetized in advance for tracking in one of a concentric circle form and a spiral form with respect to the center of the disk, and is magnetized such that magnetized regions comprising different magnetization directions are alternately arranged in a radial direction, and the tracking information is recorded thereon, and
  wherein the data is recorded magnetically only on the magnetized regions magnetized in a predetermined magnetization direction, among the magnetized regions comprising different magnetization directions.

6. The information recording method according to claim 5, wherein the information recording medium is formed by laminating at least an under layer, the magnetic recording layer, a protective layer, and a lubrication film, in that order, on at least one surface of the disk-shaped support.

7. The information recording method according to claim 5, wherein the disk-shaped support comprising a substrate selected from the group consisting of an aluminum substrate, a glass substrate, a polycarbonate substrate, and a carbon substrate, and a thickness of the support is from 0.2 mm to 1.2 mm.

8. The information recording method according to claim 5, wherein the tracking information is recorded in advance by applying an external magnetic field to a master carrier, which possesses indentations and projections corresponding to the tracking information with a soft magnetic layer formed thereon, while the master carrier is in contact with the information recording medium.

9. An information recording medium comprising:
  a disk-shaped support; and
  a magnetic recording layer, which comprises a ferromagnetic metallic thin film including vertical magnetic anisotropy, formed on at least one surface of the disk-shaped support,
  wherein tracking information is recorded in advance on the magnetic recording layer in accordance with directions that are different from magnetization directions,
  wherein tracking is carried out with a magneto-optical effect based on the tracking information recorded on the magnetic recording layer,
  wherein data is magnetically recorded by applying a magnetic field perpendicular to a disk surface to the magnetic recording layer,
  wherein the data is read with a magnetic head, and
  wherein the magnetic recording layer is magnetized in advance for tracking in one of a concentric circle form and a spiral form with respect to the center of the disk, and is magnetized such that magnetized regions comprising different magnetization directions are alternately arranged in a radial direction, and the tracking information is recorded thereon.

10. An information recording medium comprising:
  a disk-shaped support; and
  a magnetic recording layer, which comprises a ferromagnetic metallic thin film including vertical magnetic anisotropy, formed on at least one surface of the disk-shaped support,
  wherein tracking information is recorded in advance on the magnetic recording layer in accordance with directions that are different from magnetization directions,
  wherein tracking is carried out with a magneto-optical effect based on the tracking information recorded on the magnetic recording layer,
  wherein data is magnetically recorded by applying a magnetic field perpendicular to a disk surface to the magnetic recording layer,
  wherein the data is read with a magnetic head,
  wherein the magnetic recording layer is magnetized in advance for tracking in one of a concentric circle form and a spiral form with respect to the center of the disk, and is magnetized such that magnetized regions comprising different magnetization directions are alternately arranged in a radial direction, and the tracking information is recorded thereon, and
  wherein the data is recorded magnetically only on the magnetized regions magnetized in a predetermined magnetization direction, among the magnetized regions comprising different magnetization directions.

* * * * *